Figure 1:
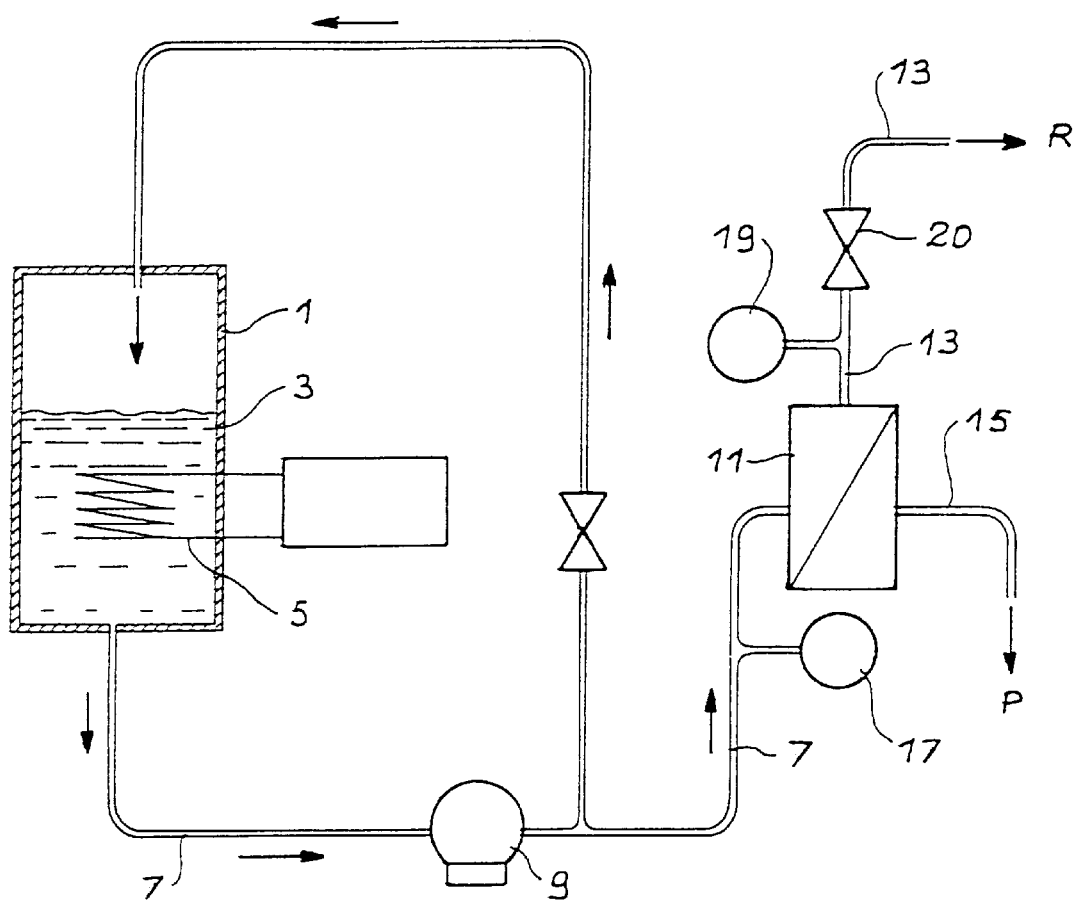

United States Patent [19]
Lemaire et al.

[11] Patent Number: 5,925,254
[45] Date of Patent: Jul. 20, 1999

[54] PROCESS FOR SEPARATING SODIUM FROM AQUEOUS EFFLUENTS RESULTING FROM THE REPROCESSING OF SPENT NUCLEAR FUEL ELEMENTS

[75] Inventors: Marc Lemaire, Villeurbanne; Jacques Foos, Orsay; Alain Guy, Pontcarre; Eric Gaubert, Aix/Provence; Colette Bardot, Villeurbanne; Rodolph Chomel, Camaret Sur Aygues; Jean-Jacques Radecky, Bagnols/Ceze; Alain Maurel, Manosque; Henri Barnier, Aix en Provence, all of France

[73] Assignees: Commissariat A l'Energie Atomique, Paris; Compagnie Generale des Matieres Nucleaires, Velizy-Villacoublay, both of France

[21] Appl. No.: 08/614,828

[22] Filed: Mar. 8, 1996

[30] Foreign Application Priority Data

Mar. 17, 1995 [FR] France .................................. 95 03137

[51] Int. Cl.⁶ .................................................. B01D 61/00
[52] U.S. Cl. .......................... 210/651; 210/652; 210/653
[58] Field of Search ..................................... 210/650, 651, 210/653, 654, 490, 500.25, 652; 423/DIG. 14

[56] References Cited

U.S. PATENT DOCUMENTS

| | | | |
|---|---|---|---|
| 3,872,001 | 3/1975 | Davis et al. ............................ | 210/638 |
| 4,161,447 | 7/1979 | Kojima .................................. | 210/652 |
| 4,925,566 | 5/1990 | Bardot et al. ......................... | 210/651 |
| 5,087,372 | 2/1992 | Toyomoto et al. .................... | 210/651 |
| 5,266,207 | 11/1993 | Boye et al. ............................ | 210/651 |
| 5,342,521 | 8/1994 | Bardot et al. ......................... | 210/490 |
| 5,346,627 | 9/1994 | Siefert et al. ......................... | 210/729 |
| 5,460,723 | 10/1995 | Bourbigot et al. .................... | 210/650 |
| 5,520,813 | 5/1996 | Korin et al. .......................... | 210/638 |

FOREIGN PATENT DOCUMENTS

| | | | |
|---|---|---|---|
| 0 250 327 | 12/1987 | European Pat. Off. ........ | B01D 13/04 |
| 0 266 945 | 5/1988 | European Pat. Off. ......... | B01J 39/10 |
| 0 497 641 | 8/1992 | European Pat. Off. .......... | G21F 9/12 |
| 2 644 772 | 9/1990 | France ............................... | C02F 1/62 |
| 107640 | 1/1985 | Japan .................................. | 210/652 |
| 236801 | 6/1986 | Japan .................................. | 210/652 |

OTHER PUBLICATIONS

Raman P. Lakshminarayan, et. al. "Consider Nanofiltration for Membrane Sedarations" Chem. Eng. Progress, Mar. 1994.

Primary Examiner—Ana Fortuna
Attorney, Agent, or Firm—Pearne, Gordon, McCoy & Granger, LLP

[57] ABSTRACT

The invention relates to a process for separating sodium from aqueous effluents resulting from the reprocessing of spent nuclear fuel elements. According to the invention, the effluent (3) is introduced into a tangential filtration module (11), whose membranes are made from polyaramide, sulphonated polysulphone or perfluorinated ionomer, so as to collect a permeate P containing sodium, depleted in radioactive elements and a retentate R enriched in radioactive elements.

10 Claims, 12 Drawing Sheets

PROCESS FOR SEPARATING SODIUM FROM AQUEOUS EFFLUENTS RESULTING FROM THE REPROCESSING OF SPENT NUCLEAR FUEL ELEMENTS

DESCRIPTION

The present invention relates to a process for separating sodium from aqueous effluents resulting from the reprocessing of spent nuclear fuel elements.

More specifically, it relates to the use of nanofiltration and charged porous membrane procedures for separating the sodium from the radioactive elements present in such effluents.

The effluents resulting from the reprocessing of spent nuclear fuel elements generally contain large amounts of sodium salts and traces of radioactive elements such as Sr, Cs, $UO_2$, Ru, etc. Generally, these effluents are concentrated by evaporation and then the concentrates are subject to a vitrification process for storing the radioactive elements in a vitreous matrix. However, the presence of a large amount of sodium in such effluents is prejudicial to the vitrification. It is therefore necessary to separate the sodium from the radioactive elements before carrying out such a treatment. For such a separation, it would be possible to use solid-liquid or liquid-liquid extraction precipitation methods, but the use thereof suffers from the disadvantage of leading to the obtaining of other waste materials, which must then in turn be treated.

The present invention relates to a process for separating sodium from effluents containing radioactive elements and which has the advantage of not leading to the production of other waste, due to the use of nanofiltration or charged porous membrane methods, for the purpose of selectively concentrating the radioactive elements in an aqueous solution and separating the sodium in aqueous solution.

Membrane methods make use of a semi-permeable membrane, which is a barrier positioned between two homogeneous media, opposing an unequal resistance to the passage of the different constituents of a fluid (suspension, solute, solvent). The force can be due to a pressure gradient (microfiltration, ultrafiltration, nanofiltration, reverse osmosis), a concentration gradient (dialysis) or a electric potential (electrodialysis).

Nanofiltration methods use membranes, whose cutoff threshold with respect to neutral solutes is between 300 and 1000 $g.mole^{-1}$. These membranes have the special feature of being selective with respect to ions in solution through a greater retention of the polyvalent ions. The membranes used can be organic, mineral or organomineral.

Thus, WO-92/06775 describes organomineral nanofiltration membranes incorporating an active polymer layer such as sulphonated polysulphones, polybenzimidazolones, polyvinylidine fluorides in grafted form and perfluorinated ionomers such as Nafion. These membranes have high retention properties for polyethylene glycols. Their cutoff threshold defined as the minimum molar mass to have a retention rate or level of 90% is in the range 300 to 1000 $g.mole^{-1}$.

The document by A. G. Gregory "Desalination of sweet-type whey salt dripping for whey solids recovery", Bulletin of the IDF 212—chapter 7, pp 38–49, indicate the NaCl rejection properties of polyaramide membranes.

FR-A-2 600 264 also describes organomineral membranes incorporating an inorganic porous support and a microporous membrane of organic polymer such as polysulphones, polyamides, cellulose esters and cellulose ethers. These membranes can be used for the desalination of water.

The present invention specifically relates to a process for separating sodium from aqueous effluents resulting from the reprocessing of spent nuclear fuel elements, using a membrane which retains the ions of the radioactive elements much more than the sodium ions, so as to be able to separate the sodium in an aqueous solution and obtain for the vitrification an aqueous solution depleted in sodium and containing virtually all the radioactive elements.

The invention therefore relates to a process for separating sodium from at least one radioactive element present in an aqueous effluent resulting from the reprocessing of spent nuclear fuel elements, characterized in that the effluent is passed through a charged porous membrane or a nanofiltration membrane, whose active layer is constituted by a polyaramide, a sulphonated polysulphone, a polybenzimidazolone, a polyvinylidene fluoride, which may or may not be grafted, a polyamide, a cellulose ester, a cellulose ether or a perfluorinated ionomer, by applying between the two opposite faces of the membrane a pressure difference so as to collect a permeate containing sodium depleted in radioactive elements and a retentate enriched in radioactive elements.

The membranes used can be a commercial nanofiltration membrane FILMTEC NF 70 or a membrane like those described in WO-92/06775, or a membrane as described in FR-A-2 600 264.

As a result of the choice of membranes used in the invention, at the end of the operation it is possible to obtain a first aqueous solution containing sodium and a second aqueous solution containing virtually all the radioactive elements and sodium in a much smaller quantity than that of the starting aqueous effluent.

The membranes used in the invention can have an active layer of polyaramide, sulphonated polysulphone or perfluorinated ionomer and said active layer is generally placed on an inorganic porous support with the optional interposing of an intermediate, organic material layer having a porosity lower than that of the support. They can be manufactured by the processes described in WO 92/06775 or FR-A-2 600 264.

Figure 4:
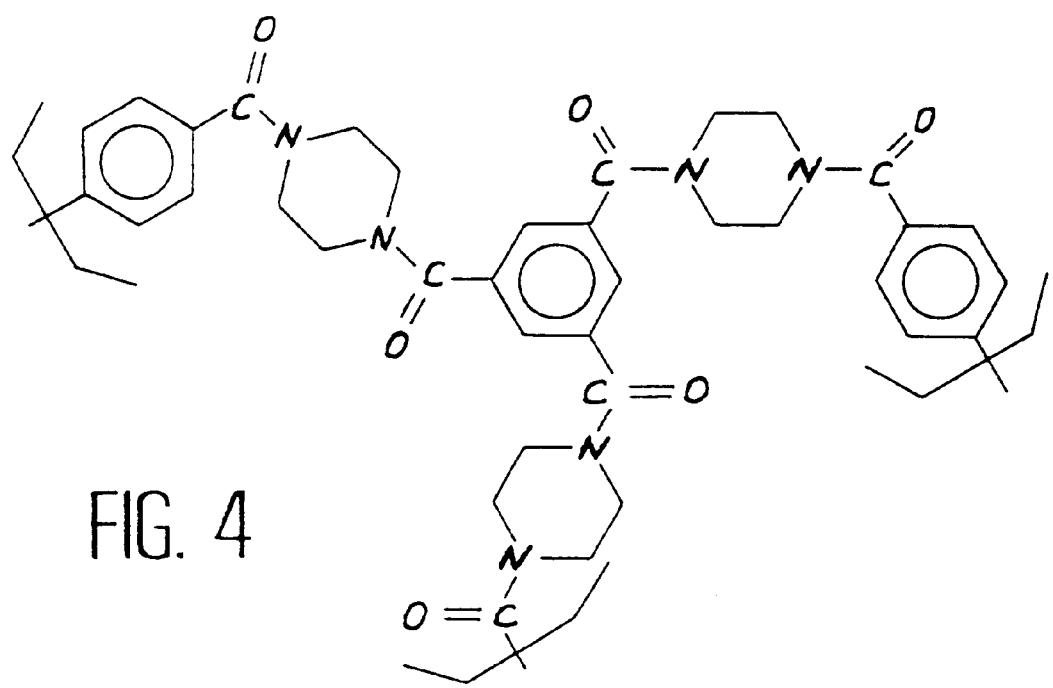

In the invention, preference is given to the use of one of the following membranes:

1) a membrane incorporating an inorganic porous support of alumina coated with an intermediate $TiO_2$ layer and an active, perfluorinated ionomer layer of formula:

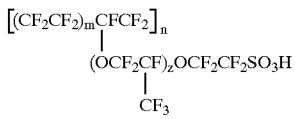

with $5 \leq m \leq 13.5$ $n \simeq 1000$, and $z = 1, 2, 3,$ 2) a polyaramide membrane like that complying with the formula given in the attached FIG. 4, 3) a membrane having a porous alumina support covered with a sulphonated polysulphone layer.

For performing the process according to the invention, use is preferably made of the tangential filtration method, which limits the phenomenon of accumulating species retained on the surface of the membrane, because the circulation of the retentate gives rise to high turbulence in the vicinity of the membrane. Moreover, this type of filtration permits a continuous use.

For this purpose, it is possible to use modules in the form of parallel plates or tubes, like those conventionally used in this method. It is also possible to use modules in which the membrane are flat and spirally wound around a perforated, hollow tube used for collecting the permeate.

In order to obtain the desired retention rates or levels, it is possible to act on the pH of the aqueous effluent, the pressure difference, the retentate circulation speed and the temperature used.

In general, the pH of the aqueous effluent is 3 to 9, because under these conditions good retention rates of the radioactive elements compared with the sodium are obtained. When the aqueous effluent to be treated has a pH outside this range, it can be adjusted beforehand to the desired value by adding NaOH or HNO$_3$.

The pressure difference applied between the two faces of the membrane can vary within a wide range, but good results are obtained with a pressure difference from 0.2 to 2.5 MPa.

In certain cases, it is possible to improve the retention level of the membrane for radioactive elements by complexing one or more elements present in the effluent. In this case, to the aqueous effluent, prior to its passage through the membrane, is added an agent which complexes at least one of the radioactive elements present in the effluent. Examples of complexing agents improving the Sr/Na separation, reference can be made to ethylene diamine tetraacetic acid, polyacrylic acid, polyvinyl sulphonic acid, salts of these acids and polyethylene imine.

As an example of a complexing agent usable for separating sodium from cesium, reference can be made to tetramethylcalixresorcinolarenes of formula:

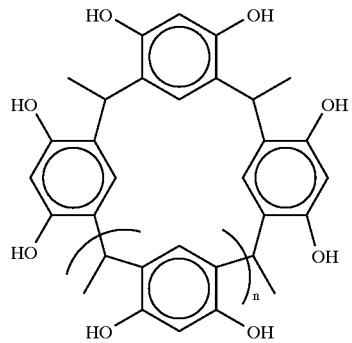

with n being an integer from 1 to 5.

Such calixarenes can be obtained by the process described in "Two stereo-isomeric macrocyclic resorcinol-acetaldehyde condensation products" by A. G. Sverker Hogberg, J. Org. Chem., 1980, 45, pp 4498–4500.

For the performance of the process according to the invention, the retentate flow rates are chosen so as to obtain the desired separation.

Working generally takes place at ambient temperature, or a higher or lower temperature ranging e.g. between 5 and 35° C.

For performing the process of the invention, use can be made of several modules in series and/or in parallel, optionally using different membranes in certain modules for increasing the rejection or discharge rate with respect to certain elements compared with the sodium, so as to obtain at the end of the operation an aqueous sodium solution containing virtually no radioactive element and which can be discharged into the environment.

Therefore this process is very advantageous, because it leads to an aqueous solution of radioactive elements appropriate for the vitrification treatment, without giving rise to other waste materials requiring conditioning.

Other features and advantages of the invention can be gathered from reading the following description of exemplified embodiments given in an illustrative and non-limitative manner with reference to the attached FIGS. 1 to 16, wherein show:

FIG. 1 A diagrammatic representation of the installation for performing the process according to the invention.

Figure 2:
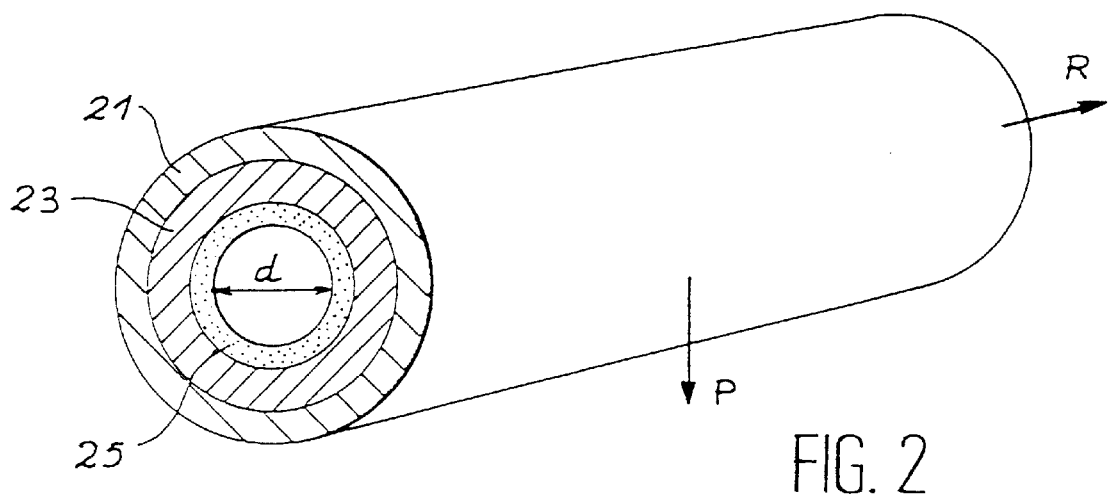

FIG. 2 A tubular nanofiltration membrane usable in the installation of FIG. 1.

Figure 3:
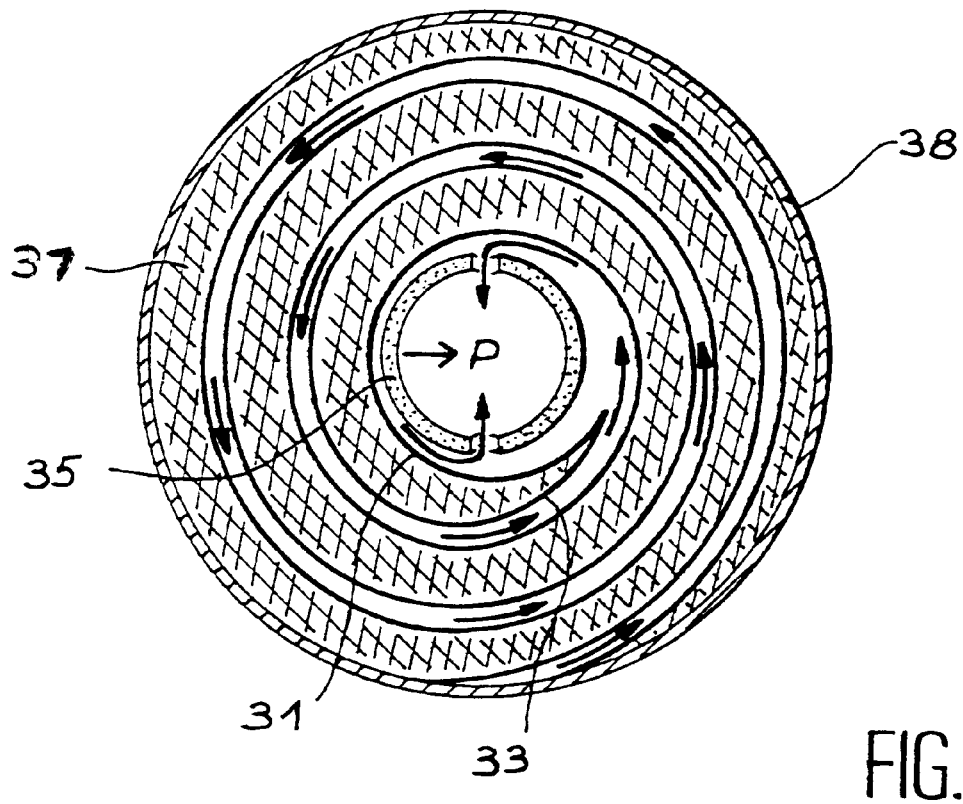

FIG. 3 A spiral nanofiltration module usable in the installation of FIG. 1.

FIG. 4 The formula of a polyaramide used in the invention.

FIGS. 5 to 9 Graphs representing the influence of the pressure, pH, strontium concentration or sodium concentration on the retention rate of nanofiltration membranes used in the invention.

Figure 10:
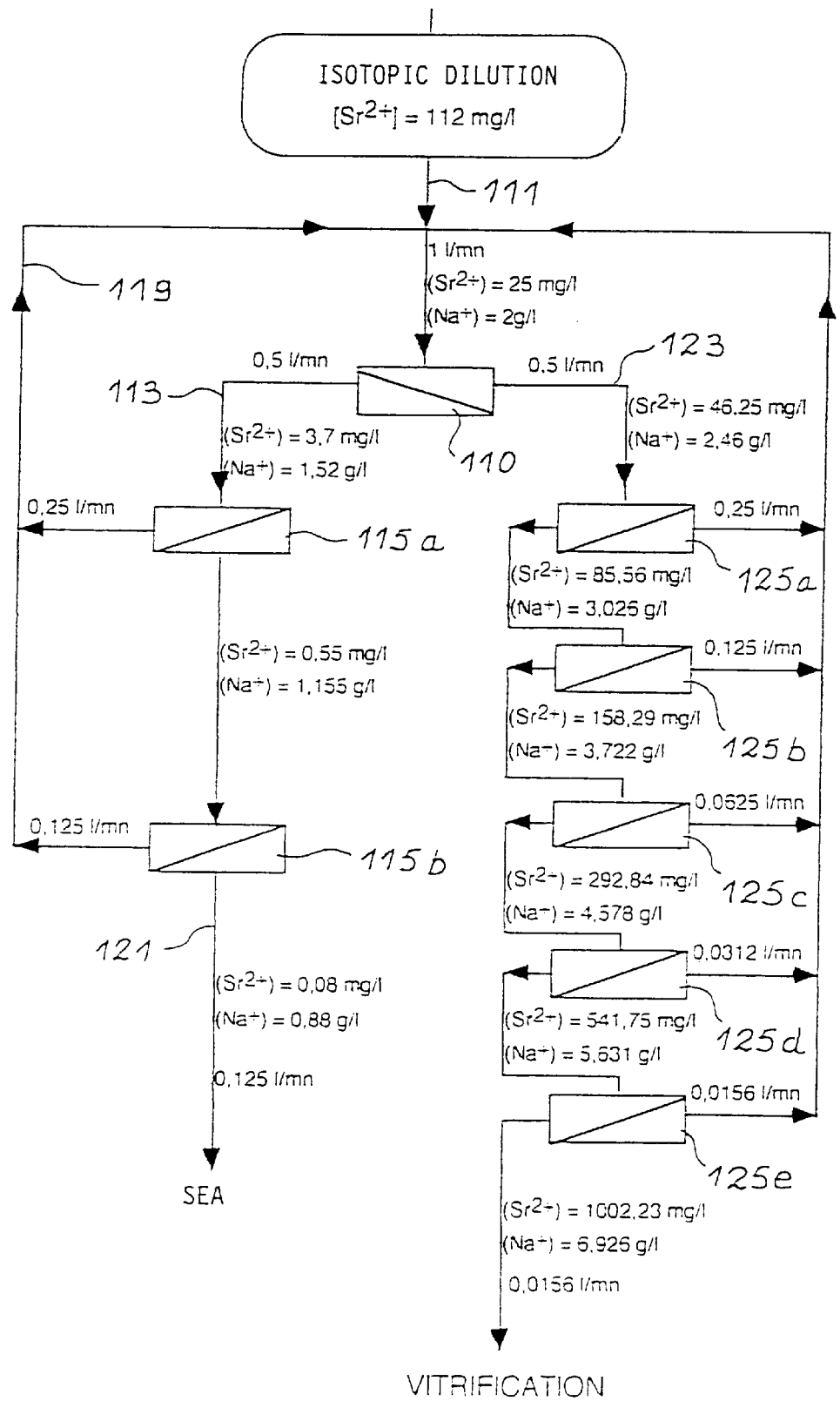

FIG. 10 The results obtained using several successive nanofiltration modules for separating sodium from an effluent containing strontium.

Figure 11:
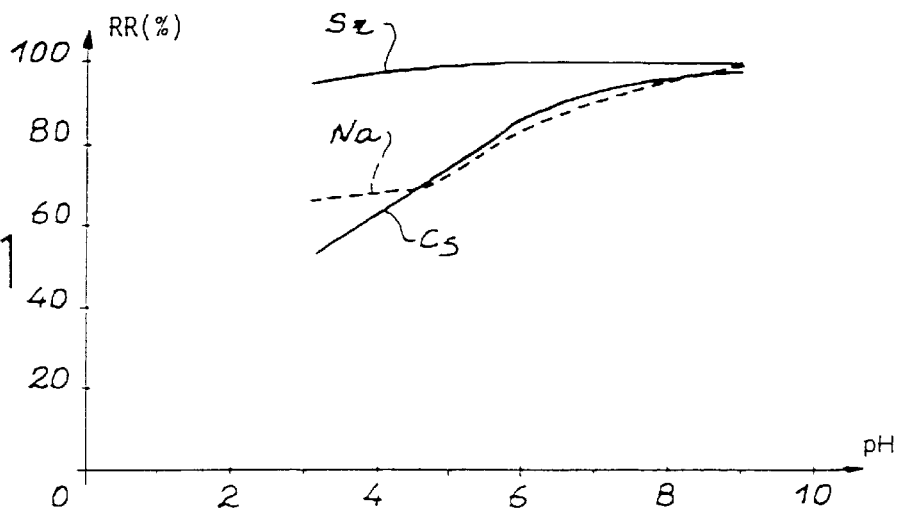
Figure 12:
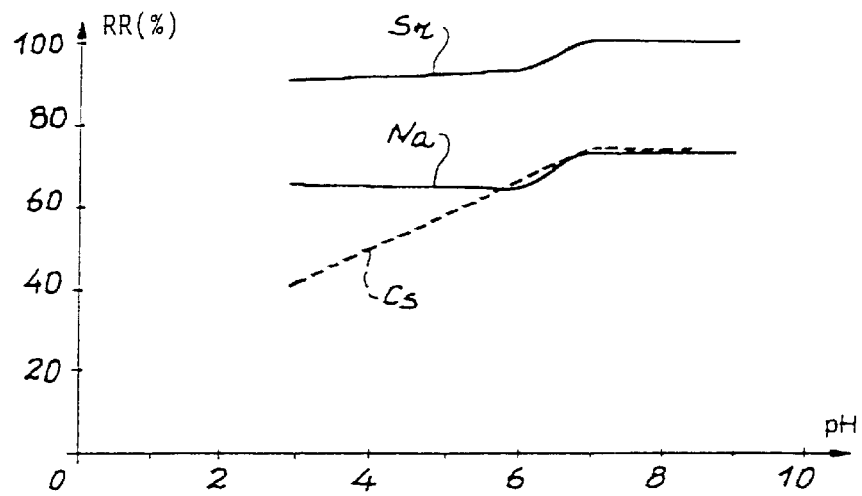

FIGS. 11 and 12 The influence of the completing pH of the strontium by ethylene diamine tetraacetic acid or polyacrylic acid on the membrane retention rate.

FIGS. 13 to 16 The influence of the sodium concentration and pressure on the retention rates of two charged porous membranes according to the invention.

FIGS. 17 to 20 The influence of the pH on the retention rates of a nanofiltration membrane with the following respective complexing agents: polyvinyl sulphonic acid (PVSA), polyethylene imine (PEI), polyacrylic acid (PAA) and ethylene diamine tetraacetic acid (EDTA).

Figure 21:
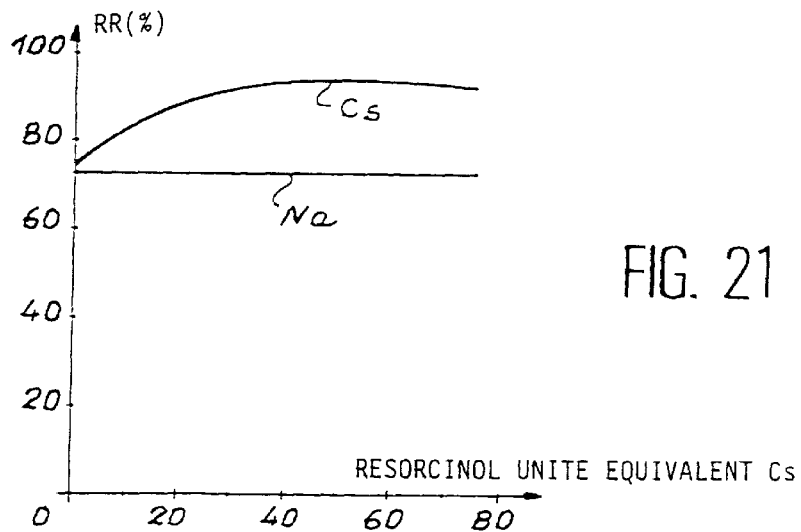

FIG. 21 The influence of the concentration of the complexing agent (tetramethylcalix[4]-resorcinolarene) on the retention rate of a nanofiltration membrane relative to sodium and cesium.

Figure 22:
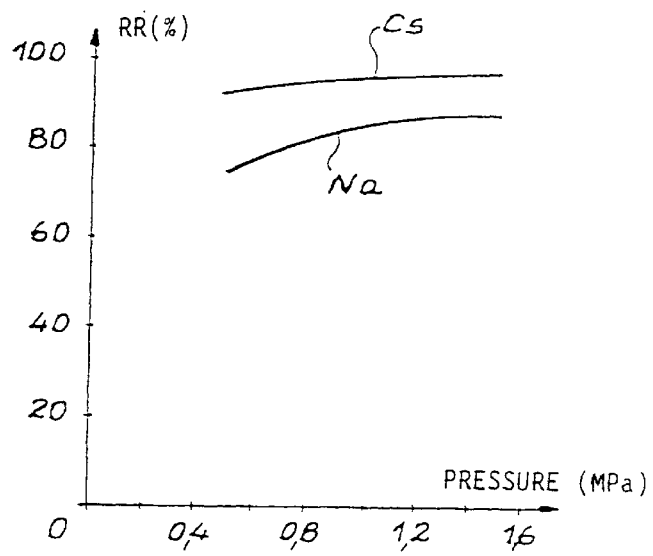
Figure 23:
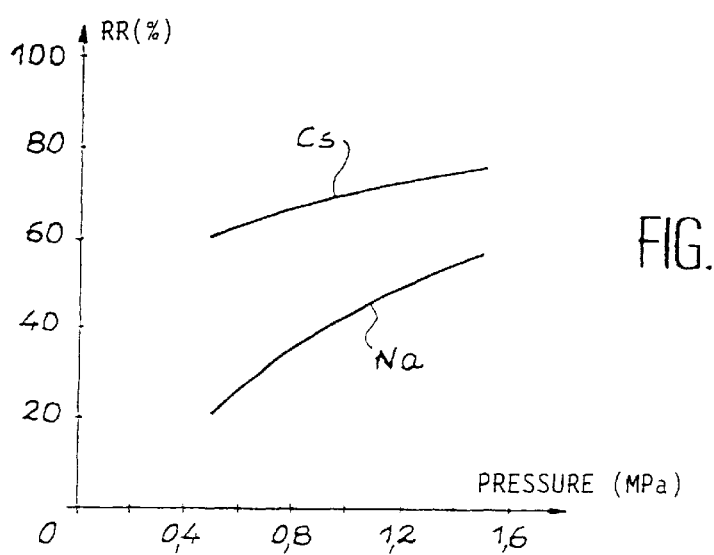

FIGS. 22 & 23 The influence of the transmembrane pressure on the retention rate of the membrane for sodium and cesium in the presence of the complexing agent used for FIG. 21.

Figure 24:
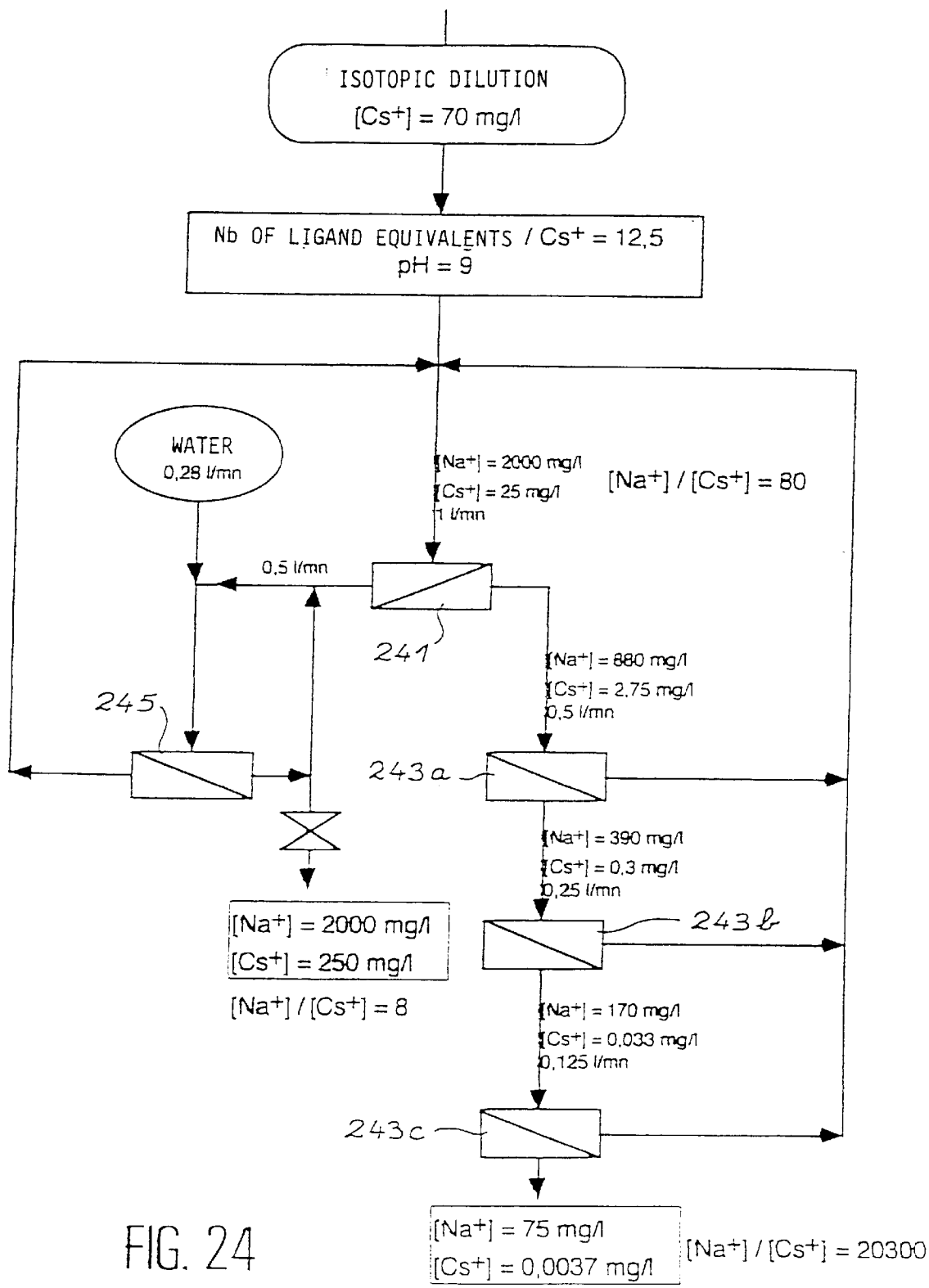

FIG. 24 The diagram of a nanofiltration-complexing Cs/Na separation installation.

Figure 25:
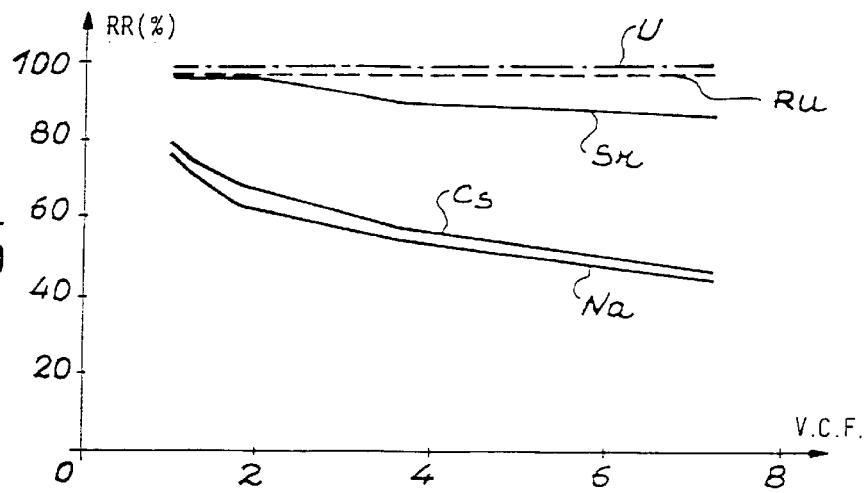

FIG. 25 The influence of the volume concentration factor (VCF) on the retention rates of a nanofiltration membrane using PAA as the complexing agent or sequestrant.

The volume concentration factor is defined by the formula:

$$VCF = \frac{\text{initial effluent volume (supply)}}{\text{final effluent volume (retentate volume)}}$$

Figure 26:
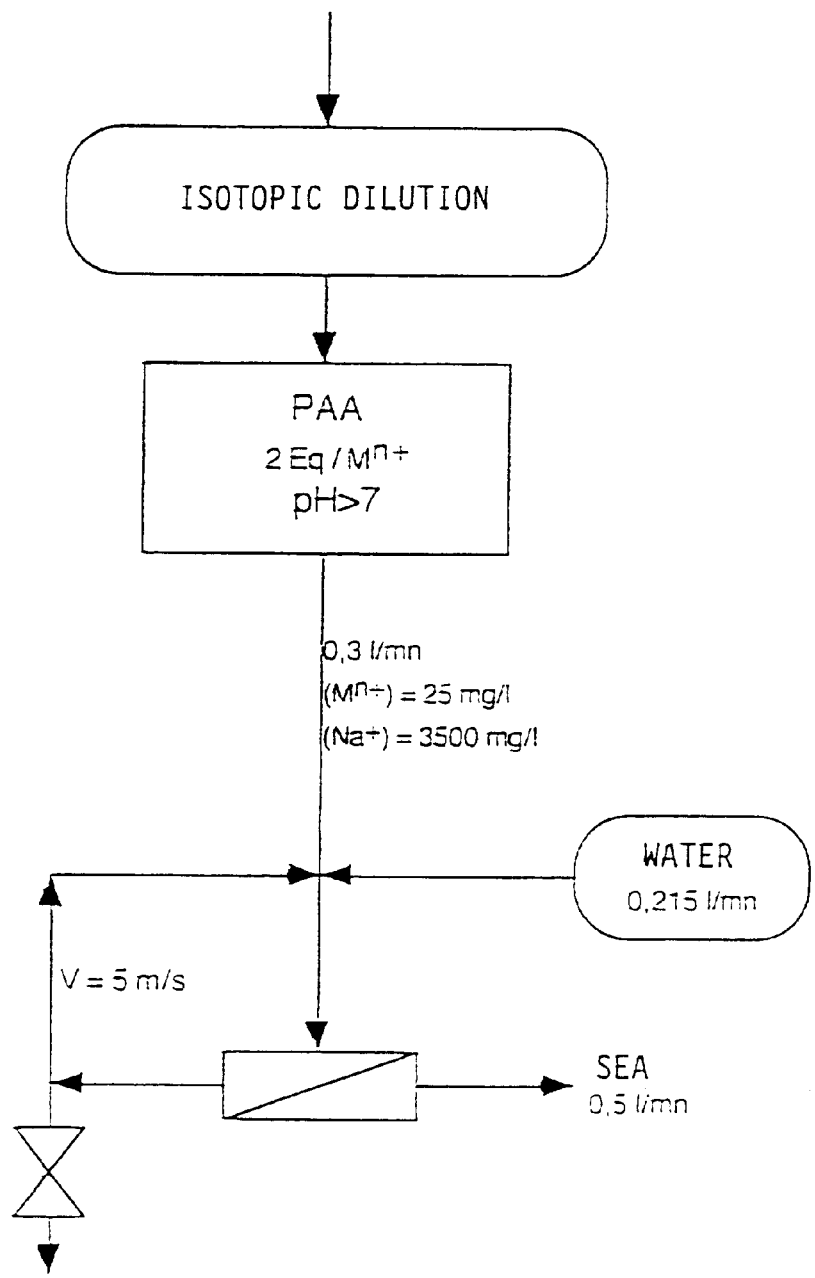

FIG. 26 The diagram of a diafiltration installation using PAA as the complexing agent.

Figure 27:
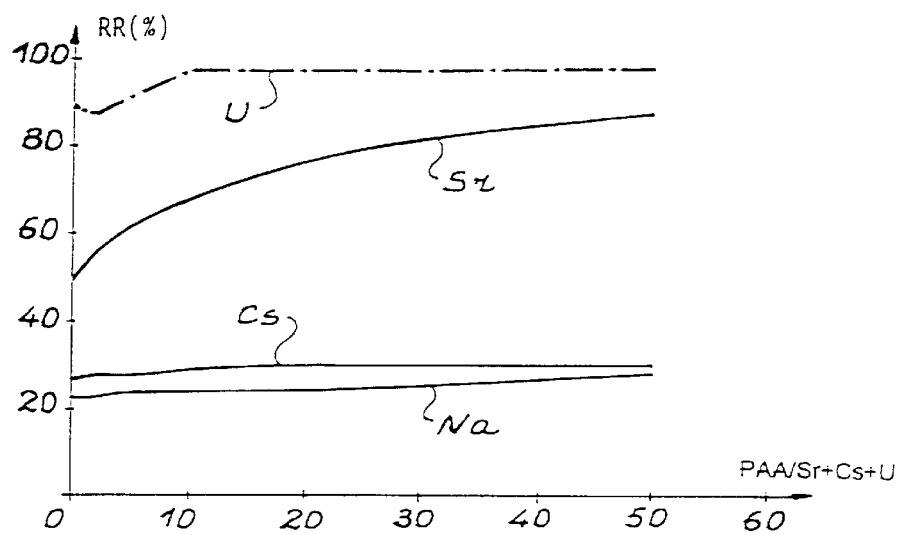

FIG. 27 The influence of the content of the complexing agent PAA on the retention rates of a nanofiltration membrane.

Figure 28:
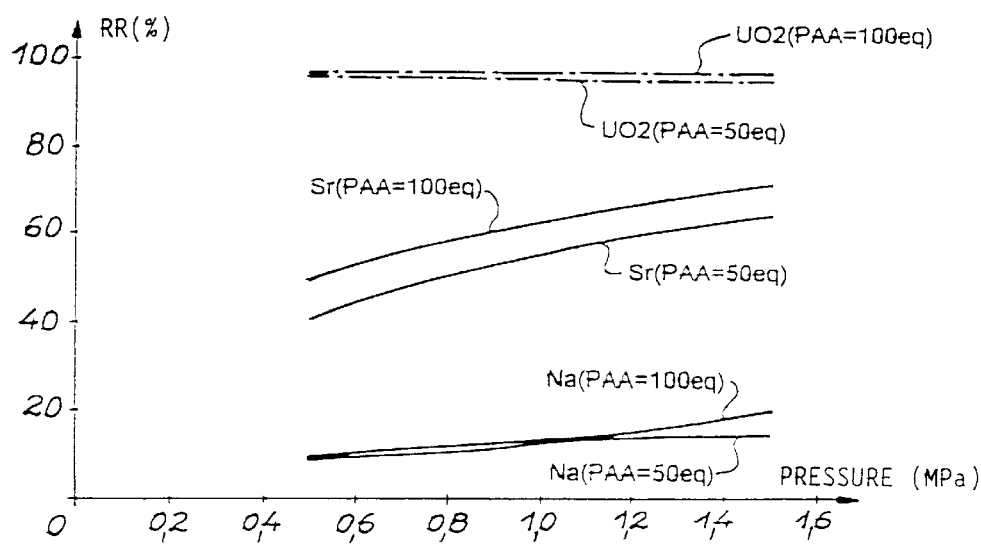

FIG. 28 The influence of the pressure on the retention rates of a nanofiltration membrane with completing by PAA.

FIG. 1 shows an installation of a tangential filtration module comprising a tank 1 containing the effluent 3 to be treated, which can be maintained at an appropriate temperature by a cryostat 5. The effluent to be treated is introduced from the tank 1 by a pipe 7 equipped with a pump 9 into the filtration module 11, from which is drawn off the retentate R by means of the pipe 13 and the permeate P by means of the pipe 15. The pipes 7 and 13 are equipped with manometers 17 and 19 and the pipe 13 with a valve 20.

In the filtration device 11 use can be made of tubular membranes like that shown in FIG. 2, or spiral modules, like that shown in FIG. 3.

FIG. 2 shows in perspective a tubular membrane having a support 21 made from an inorganic material, e.g. α-alumina coated with an intermediate, inorganic layer 23, e.g. of $TiO_2$, and an active layer 25, e.g. of Nafion.

The internal diameter of the tube d is e.g. 7 mm, the thickness of the active layer 25 can be 0.1 µm, the thickness of the inorganic layer 23 can be 3 to 5 µm and the thickness of the alumina support can be 1.5 mm. With tubes of this type, it is possible to circulate the effluent to be treated in the interior of the tube. This leads to the collection of the retentate R at the tube outlet and the permeate P at the tube periphery.

A group of tubes of this type can be installed in conventional manner in an enclosure between two end plates, which define with the enclosure an introduction space for the effluent and a collection space for the retentate, the permeate being collected in the enclosure.

FIG. 3 shows a spiral module having two semi-permeable membranes 31, 33 spirally wound around a hollow, perforated support tube 35, which defines a collection tube for the permeate P. The two membranes are maintained at an appropriate spacing by a grating 37 and are located in a tight tube 38. With such a module, the effluent is circulated in the space between the membranes 31, 33 equipped with the grating 37 and the permeate is collected in the space illustrated by the arrows leading to the tube 35.

The following examples illustrate the results obtained with the process of the invention.

EXAMPLE 1

In this example treatment takes place of an aqueous effluent (pH 5.5) having 2 g/l of $Na^+$ ions, 25 mg/l of $Sr^{++}$ ions, 25 mg/l of $UO_2^{++}$ ions and 25 mg/l of $Cs^+$ ions, using as the membrane that marketed under the name FILMTEC NF70, which is formed by a spiral module like that of FIG. 3 using polyaramide membranes, whose formula is given in FIG. 4. The FILMTEC NF70 membrane has a permeability to bidistilled water of 4.5 $l.h^{-1}.m^{-2}.bar^{-1}$.

This example studies the influence of the pressure applied on the retention rate of sodium, cesium, strontium and uranium. The retention rate RR is defined by the formula:

$$RR=[(C_O-C_P)/(C_O)] \times 100$$

in which $C_O$ represents the concentration of the element in the supply and $C_P$ represents the concentration of the element in the permeate.

In each case, no matter what the pressure applied to the effluent, the installation is made to operate at 27° C., at atmospheric pressure on the permeate side and with a constant retentate flow rate of 800 l/h and determination takes place of the concentrations in elements of the retentate and permeate by atomic absorption spectrometry in the case of sodium, cesium and strontium and plasma torch in the case of uranium. The results obtained for the pressures from 0.25 to 1.5 MPa are given in FIG. 5.

Figure 5:
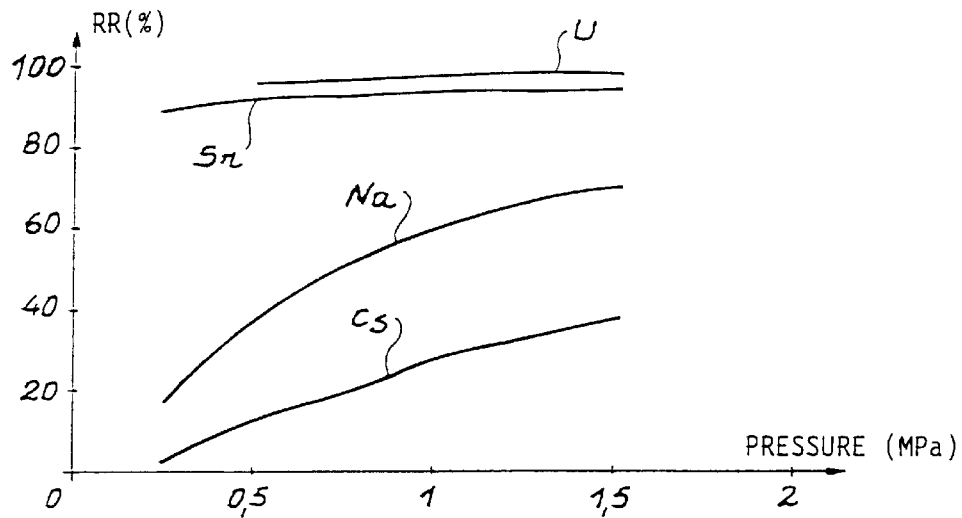

The curves of FIG. 5 illustrate the retention rates of Cs, Na, Sr and U, as a function of the pressure applied. These curves show that cesium and sodium are retained less than strontium or the other multicharged cations, which makes it possible to separate the sodium from the uranium and strontium.

EXAMPLE 2

This example also studies the influence of the pressure on the retention rates of Na, Cs, Sr and U using an effluent with the same composition as that of example 1, but a tubular nanofiltration membrane TN260, whose active layer is of Nafion and which has a structure like that illustrated in FIG. 2.

This membrane comprises a 1.5 mm α-alumina support, an intermediate, 3 to 5 µm $TiO_2$ layer and an approximately 0.1 µm Nafion nanofiltrating layer. It has a permeability to bidistilled water of 3.5 $l.h^{-1}.m^{-2}.bar^{-1}$.

Figure 6:
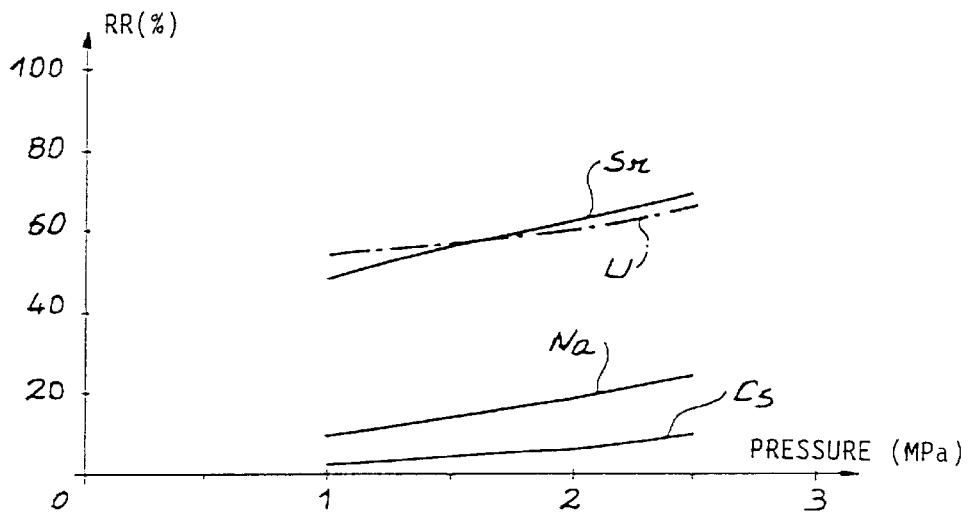

In this case working takes place at 35° C. with a retentate flow rate of 800 l/h. FIG. 6 gives the results obtained on varying the pressure from 1 to 2.5 MPa.

As with the FILMTEC NF70 membrane, sodium and cesium are retained less than strontium and uranium.

EXAMPLE 3

This example studies the influence of the pH of the effluent on the retention rate of sodium and strontium using as the membrane the FILMTEC NF70 membrane used in example 1 and an aqueous effluent containing 2 g/l of $Na^+$ and 25 mg/l of $Sr^{++}$. Between the two faces of the membrane is applied a pressure difference of 0.9 Mpa and the retentate flow rate is set to 800 l/h. The operating temperature is 27° C.

Figure 7:
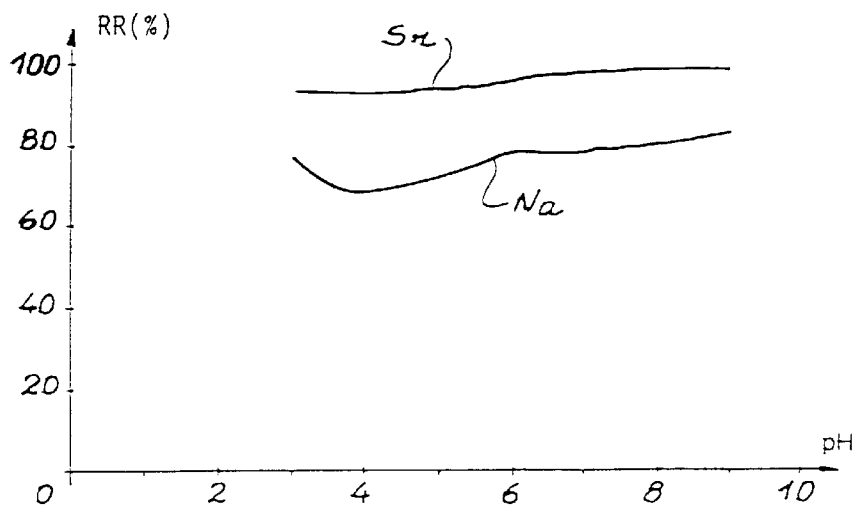

The sodium and strontium retention rates obtained under these conditions and as a function of the effluent pH, are given in FIG. 7. FIG. 7 shows that the sodium is less retained than the strontium. However, the calculation of the Sr/Na selectivities (defined by: Sr//Na selectivity=(100-TRNa)/(100-TRSr)) reveals a better Sr/Na separation at high pH-values.

| Retentate pH | TRNa | TRSr | Sr/Na selectivity = (100 − TRNa)/(100 − TRSr) |
|---|---|---|---|
| 3.06 | 76.3 | 92.6 | 3.2 |
| 4.08 | 67.6 | 92.5 | 4.3 |
| 5.39 | 73 | 93 | 3.86 |
| 6 | 77.6 | 95 | 4.5 |
| 6.6 | 77.6 | 96.6 | 6.6 |
| 9 | 81.7 | 98 | 9.15 |

EXAMPLE 4

This example studies the influence of the strontium concentration on the retention rates of the FILMTEC NF70 membrane. The starting effluent has a pH of 4.5 and contains 2 g/l of $Na^+$, the strontium concentration being varied from 0 to $6.3 \cdot 10^{-5}$M. Filtration takes place under a pressure difference of 0.4 MPa at a temperature of 26° C., whilst regulating the flow rate in such a way that the retentate rate is 800 l/h.

Figure 8:
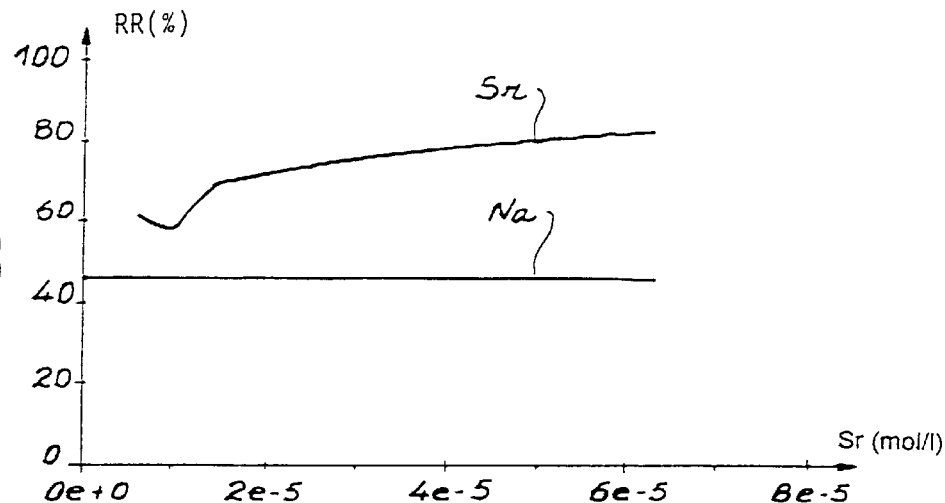
Figure 9:
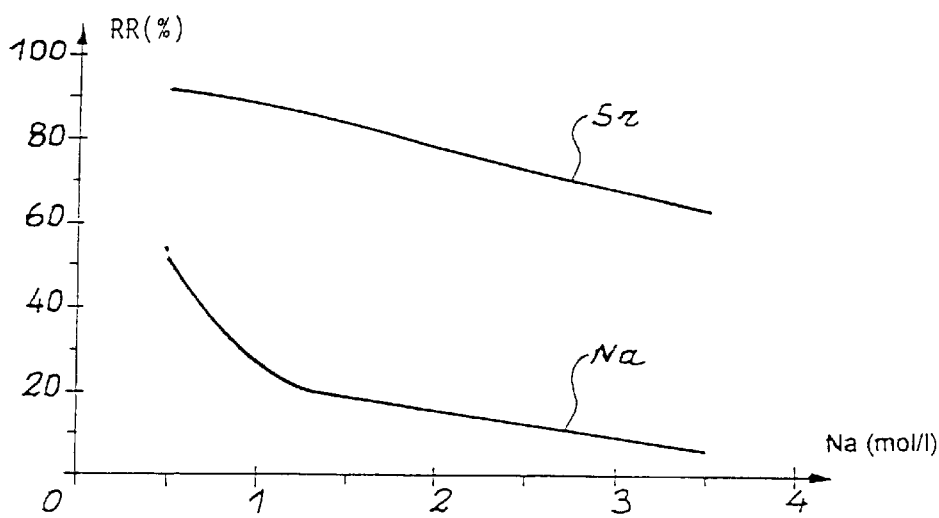

The results obtained are given in FIG. 8, where it can be seen that when the Sr content drops the Sr/Na selectivity passes through a minimum.

EXAMPLE 5

This example studies the influence of the sodium concentration on the retention rates of the FILMTEC NF70 membrane.

Use is made here of a liquid effluent with a pH of 5.5, a $Sr^{2+}$ concentration of 25 mg/l and a pressure difference is applied of 1.2 MPa with a retentate flow rate of 800 l/h. The results obtained are given in FIG. 9, where it is possible to see a drop of the $Sr^{2+}/Cs^+$ selectivity to a $NaNO_3$ value of 2.6 to 3.5M.

The results of examples 1 to 5 show that the FILMTEC NF70 membrane can be used for obtaining, from an aqueous effluent, an aqueous sodium solution containing virtually no radioactive element.

EXAMPLE 6

FIG. 10 shows an installation for treating an aqueous effluent containing strontium and sodium. This installation comprises several nanofiltration modules in series and in parallel, so as to obtain at the outlet of the installation an aqueous sodium solution which can be discharged into the ocean and a strontium solution having a low sodium content and treatable by vitrification.

FIG. 10 shows that the installation comprises a first nanofiltration module 110 into which the aqueous effluent to be treated is introduced by pipe 111.

The permeate which passes out of the nanofiltration module through pipe 113 is treated in series in two nanofiltration modules 115a and 115b, the retentate produced in each of these modules being recycled by the pipe 119 into the first nanofiltration module 110. The solution passing out of the final nanofiltration module 115b through the pipe 121 is constituted by an aqueous solution essentially containing sodium and which can be discharged into the ocean.

The retentate passing out of the first nanofiltration module 110 through the pipe 123 is treated in series in the modules 125a, 125b, 125d and 125e, the permeates obtained in each module being recycled with the aqueous effluent to be treated into the first nanofiltration module 110.

On leaving the final nanofiltration module 125e, a retentate is obtained containing only little sodium and most of the radioactive elements. Each nanofiltration module can be made to operate in such a way as to obtain an identical permeate and retentate flow rate.

The recycled and treated flow rates and the strontium and sodium concentrations of the different flows are given in FIG. 10. The pressure difference applied in each module is 0.5 MPa.

It can be seen that the retentate solution leaving the final nanofiltration module has been enriched in strontium compared with sodium and can be passed directly into a vitrification installation. The permeate obtained at the outlet from the nanofiltration module 115b contains very little strontium compared with sodium and can be directly discharged into the ocean.

In this installation, in order to compensate the Sr quantities sent for vitrification and make the installation operate with a constant strontium concentration, strontium is added to the feed, i.e. 112 mg/l of Sr. The addition of a small non-radioactive strontium quantity (or another element) is an isotopic dilution enabling the membrane to operate at its maximum retention efficiency for said cation or some other element.

This installation makes it possible to treat $1.9 \text{ l.h}^{-1}.\text{m}^{-2}$ in the case of the FILMTEC NF70 membrane.

EXAMPLE 7

In this example treatment takes place of an aqueous effluent containing sodium, strontium and cesium with the same composition as in example 1. However, the strontium retention rate is improved by adding a complexing agent constituted by ethylene diamine tetraacetic acid (ETDA) at a concentration of 0.04 mole/l, which corresponds to 0.5 eq. with respect to $Na^+$.

To treat the effluent use is made of the nanofiltration module of FIG. 3 with the FILMTEC NF70 membrane. The pressure difference applied is 0.5 MPa and the retentate flow rate is fixed at 800 l/h. The temperature is 25° C.

The influence of the pH of the effluent is studied on the retention rates of strontium, sodium and cesium. The results obtained are given in FIG. 11. The latter makes it clear that the retention of strontium is virtually total for a pH above 6 and that the retention rates of cesium and strontium also increase with the pH.

EXAMPLE 8

This example follows the operating procedure of example 7 for treating an effluent having the same composition, but using as the complexing agent polyacrylic acid with a concentration of $1.2 \cdot 10^{-3}$ mole/l, which corresponds to 2 monomer equivalents with respect to all the ions $Cs^+$, $Sr^{++}$ and $UO_2^{++}$.

The results obtained are given in FIG. 12, which illustrates the evolution of the retention rates of strontium, cesium and sodium as a function of the pH. Once again, for pH-values above 6, the strontium retention is almost complete.

Thus, with the FILMTEC NF70 membrane, the optimum sodium-strontium selectivity is obtained with polyacetic acid at a pH above 7 $RR(Na^+)=72\%$ and $RR(Sr^{2+})=100\%$. In addition, with the addition of polyacrylic acid, it is possible to use a single nanofiltration module for discharging into the ocean a solution only containing sodium and supplying for vitrification a solution only containing 10% of the initial sodium and all the strontium. Such a process makes it possible to treat $18.7 \, l.h^{-1}.m^{-2}$.

EXAMPLE 9

This example uses a sulphonated polysulphone charged porous membrane placed on a porous α-alumina support of thickness 1.5 mm and with a pore radius of 0.2 μm. The sulphonated polysulphone used has the formula:

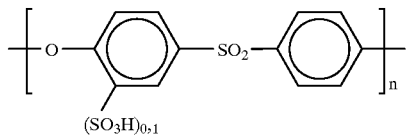

The membrane has a permeability to bidistilled water of 25 $l.h^{-1}.m^{-2}.bar^{-1}$.

A study is made of the influence of the sodium concentration on the cesium/sodium separation from an aqueous effluent containing 15 mg/l of $Cs^+$ and sodium concentrations from 0 to 0.0015 mole/l. Filtration takes place with a pressure difference of 0.2 MPa, at 25° C. and a retentate flow rate of 500 l/h, i.e. a tangential filtration velocity of 3.7 m/s.

Figure 13:
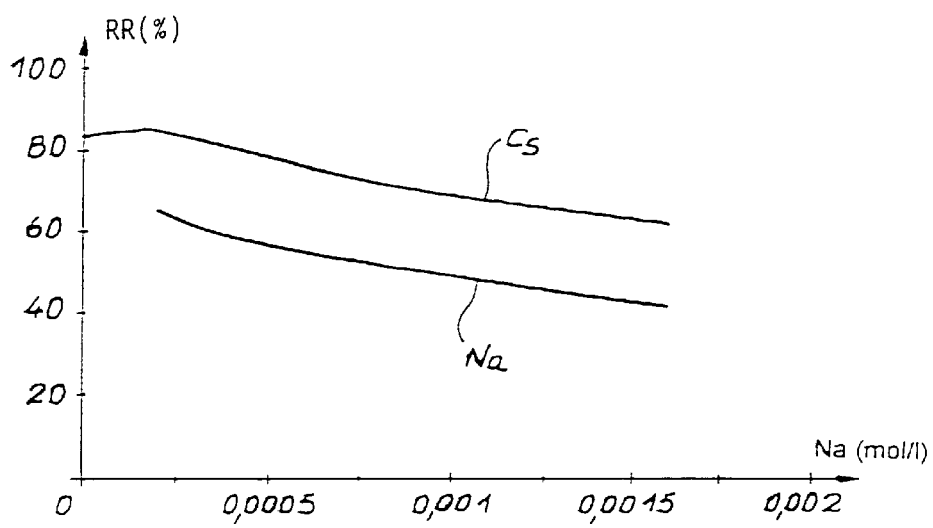

The results obtained are given in FIG. 13 representing the evolution of the sodium and cesium retention rates as a function of the sodium concentration. FIG. 13 makes it clear that the cesium is retained more than the sodium and that the $Cs^+/Na^+$ selectivity drops when the sodium concentration rises (Cs/Na selectivity=2.3 at $2 \cdot 10^{-4}M$ sodium and Cs/Na selectivity=1.5 at $1.6 \cdot 10^{-3}M$ sodium).

EXAMPLE 10

This example uses the same membrane as in example 9 for treating an aqueous effluent incorporating 15 mg/l of $Cs^+$ and 5 mg/l of $Na^+$, at a temperature of 25° C., a retentate flow rate of 500 l/h and a tangential filtration velocity of 3.7 m/s. A study takes place of the influence of the pressure difference applied between the two faces of the membrane on the retention rates of cesium and sodium.

Figure 14:
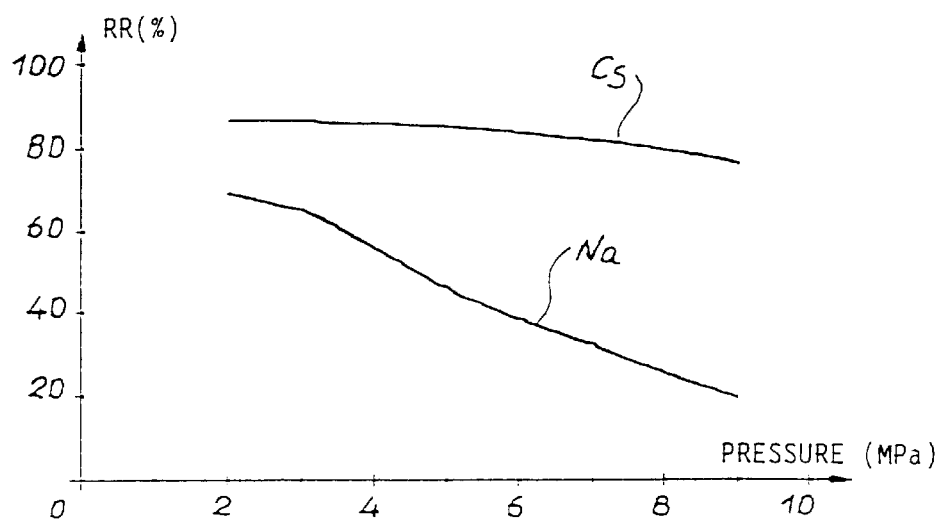

The results obtained are given in FIG. 14, which shows the evolution of the retention rates of sodium and cesium as a function of the pressure difference applied. Thus, the sodium-cesium selectivity increases with the transmembrane pressure.

EXAMPLE 11

This example uses a sulphonated polysulphone charged porous membrane deposited on a porous α-alumina support with a pore radius of 0.2 μm and having a permeability to bidistilled water of 14 $l/h^{-1}.m^{-2}.bar^{-1}$. This membrane is used for treating an aqueous effluent incorporating 15 mg/l of $Cs^+$ and variable sodium concentrations, by applying a pressure difference of 0.5 MPa, at a temperature of 25° C. and with a retentate flow rate of 500 l/h, i.e. a tangential filtration velocity of 3.7 m/s.

Figure 15:
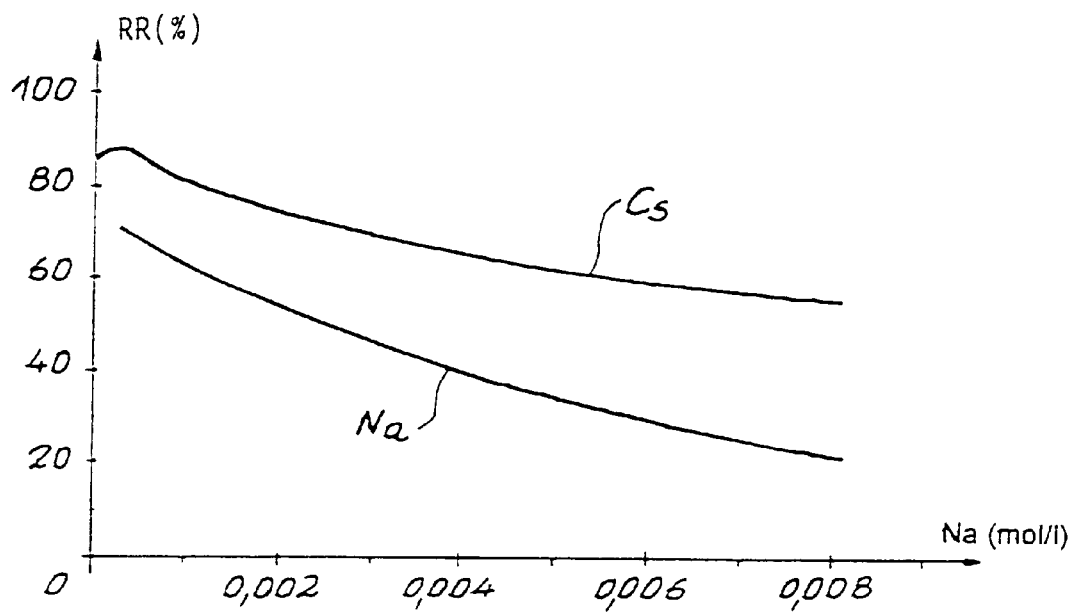

The results obtained are given in FIG. 15, which illustrates the variations of the retention rates of sodium and cesium as a function of the sodium concentration. FIG. 15 makes it clear that a $Cs^+/Na^+$ selectivity is obtained, which decreases when the sodium concentration increases (Cs/Na selectivity=2.5 at $2.6 \cdot 10^{-4}M$ sodium and Cs/Na selectivity=1.73 at $8.10 \cdot 10^{-3}M$ sodium).

EXAMPLE 12

This example follows the operating procedure of example 11 for treating an aqueous effluent incorporating 15 mg/l of $Cs^+$ and 200 mg/l of $Na^+$ operating under the same conditions, but a study is made of the influence of the pressure difference applied on the cesium and sodium retention rates.

Figure 16:
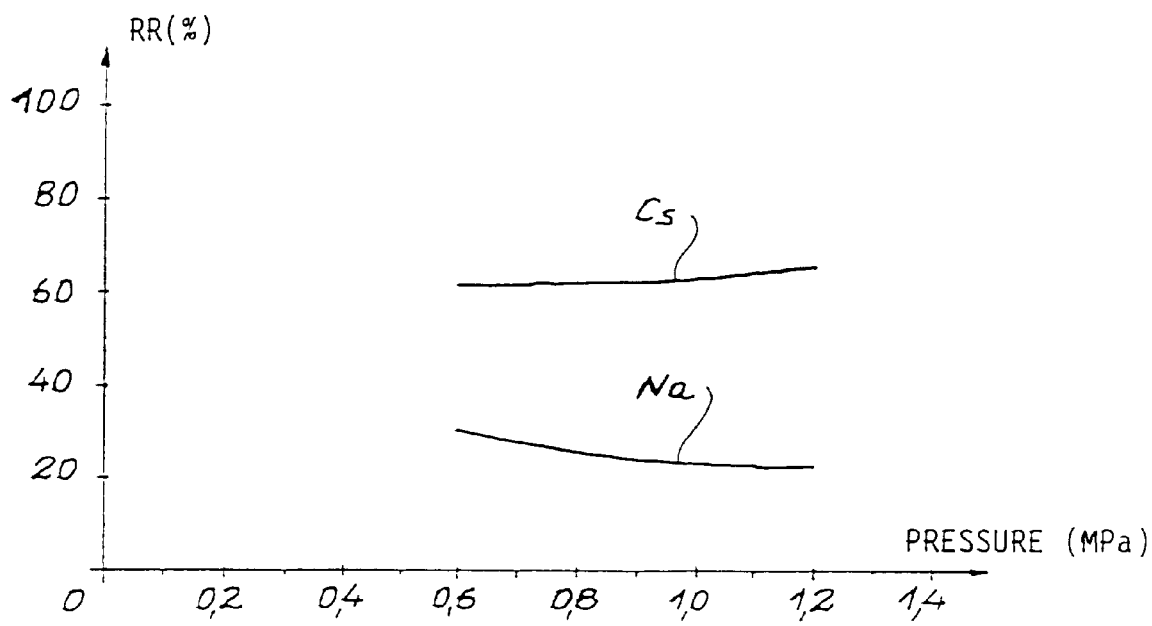
Figure 17:
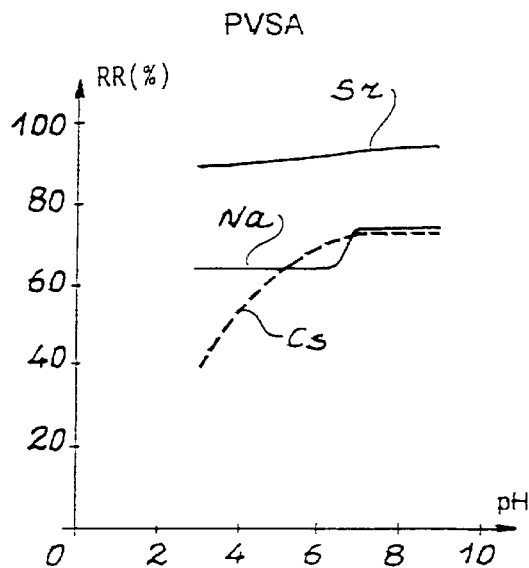
Figure 18:
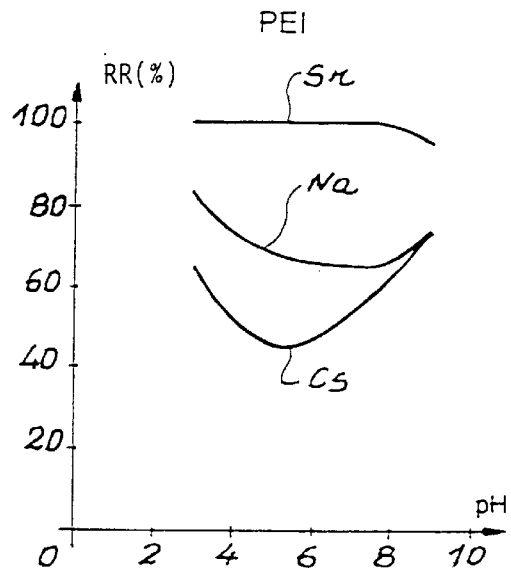
Figure 19:
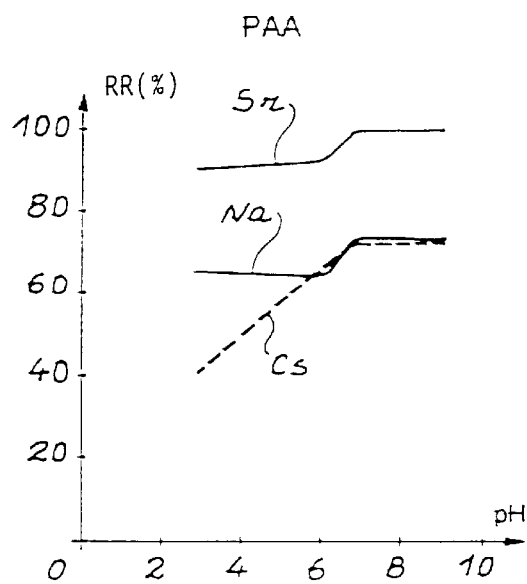
Figure 20:
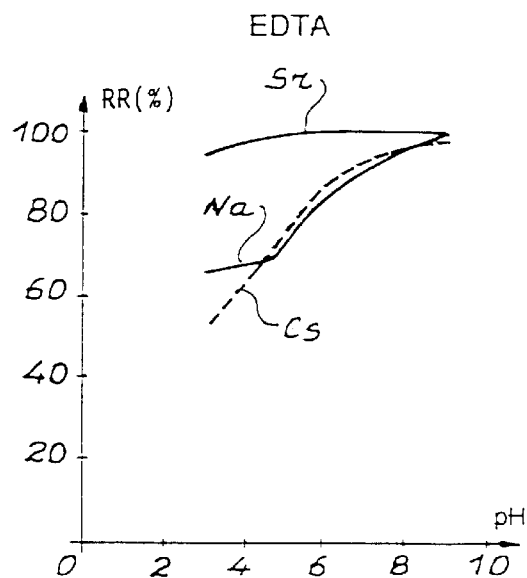

The results obtained are given in FIG. 16, which shows the evolution of the cesium and sodium retention rates as a function of the pressure applied. A good cesium-sodium selectivity is obtained and it can be seen that the pressure has little influence on the selectivity.

Examples 9 to 11 show that sulphonated polysulphone membranes have good Cs/Na separation properties.

Thus, by combining in the same effluent treatment installation these membranes and FILMTEC NF70 membranes, it is possible to separate sodium from al the radioactive elements present in the aqueous effluent to be treated.

EXAMPLES 13 TO 16

These examples follow the operating procedure of example 1 for treating an aqueous effluent with the same composition and using as the membrane the FILMTEC NF70 membrane, but accompanied by the addition to the effluent of a complexing agent or sequestrant for modifying the selectivity of the membrane.

In example 13, the complexing agent is polyvinyl sulphonic acid (PVSA) sodium salt, 25 wt. %, marketed by ALDRICH, which has a molecular weight of 2000 g/mole and complies with the formula:

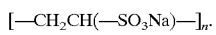

Example 14 uses a polyethylene imine (PEI), 50 wt. %, marketed by ALDRICH and complying with the formula:

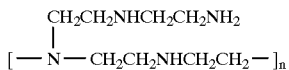

(molecular weight: 5000 g/mole).

Example 15 uses as the complexing agent polyacrylic acid (PAA), 65 wt. %, marketed by ALDRICH and complying with the formula:

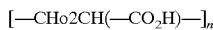

(molecular weight: 2000 g/mole).

Example 16 uses ethylene diamine tetraacetic acid (EDTA) disodium salt in dihydrate form marketed by PRO-LABO and of formula:

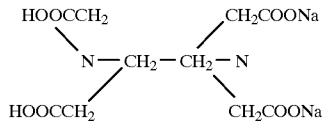

The operating conditions are as follows:
[$Na^+$] 2 g/l
[$Sr^{2+}$]=[$UO_2^{2+}$]=[$Cs^+$]=25 mg/l
$\Delta P$=0.5 MPa
number of equivalents of the monomer of PAA, PEI or PVSA/($Sr^{2+}$+$UO_2^{2+}$+$Cs^+$)=2
number of equivalents of EDTA/$Na^+$=0.5
T=25° C.
retentate flow rate=800 l/h.

The results obtained with these complexing agents with respect to the retention rate (RR in %) of strontium, sodium and cesium are given in FIGS. 17 to 20.

These drawings make it clear that EDTA, PEI and PAA lead to a high Sr/Na selectivity with a virtually complete retention of the strontium in a pH range individual to each complexing agent. EDTA and PAA complex Sr for a pH higher than 6, whereas PEI functions at a pH below 7. Thus, the nature of the complexing agent can be chosen as a function of the pH of the effluent to be treated. Uranium was only determined in the case of PAA, its retention rate exceeding 97.7% for a pH above 7.

EXAMPLE 17

In this example sodium is separated from cesium using as the nanofiltration membrane the FILMTEC NF70 membrane, but whilst adding to the effluent a complexing agent constituted by tetramethylcalix[4]resorcinolarene of formula:

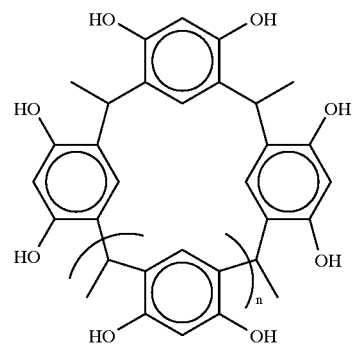

with n 1.

The starting aqueous effluent (pH=9) contains 2000 mg/l of $Na^+$ and 10 mg/l of $Cs^+$.

Na/Cs separation takes place under the following conditions:
$\Delta P$=0.5 MPa
T=25° C.
retentate flow rate=800 l/h,
following the same operating procedure as in example 1, but adding to the effluent tetramethylcalix[4]resorcinolarene at concentrations from 0 to 80 resorcinol unit equivalents per atom of Cs.

The results obtained with this complexing agent with respect to the retention rates of cesium and sodium are given in FIG. 21. FIG. 21 shows that the retention rate of cesium increases with the complexing agent concentration.

The Cs/Na selectivities for different complexing agent concentrations (number of resorcinol unit equivalents per Cs) are given hereinafter:

| Number of resorcinol unit equivalents/Cs | 0 | 25 | 50 | 75 |
|---|---|---|---|---|
| Cs/Na selectivity | 1.08 | 2.82 | 4.38 | 3.58 |

Thus, a good Cs/Na selectivity is obtained. Moreover, calixarene does not pass through the FILMTEC NF70 membrane and the flow rate of the membrane close to 9.3 $l.h^{-1}.m^{-2}$ is not modified by the addition of calixarene.

EXAMPLES 18 AND 19

These examples study the influence of the ionic strength and transmembrane pressure on the Cs/Na separation by means of the FILMTEC NF70 membrane, in the presence of tetramethyl calix[4]resorcinolarene at a concentration representing 50 resorcinol unit equivalents per Cs.

In the two examples, the aqueous effluent (pH=9) contains 10 mg/l of $Cs^+$. It also contains 2 g/l of $Na^+$ in example 18 and 10 g/l of $Na^+$ in example 19.

In the two examples, the following operating conditions are used:
T=30° C.,
retentate flow rate=800 l/h
$\Delta P$=0 to 1.6 MPa.

The retention rates RR (%) of Cs and Na obtained as a function of the pressure difference $\Delta P$ are given in FIGS. 22 (example 18) and 23 (example 19). The Cs/Na selectivities are as follows:

| Transmembrane pressure ΔP (MPa) | Cs/Na selectivity Na⁺ = 2 g/l | Cs/Na selectivity Na⁺ = 10 g/l |
| --- | --- | --- |
| 0.5 | 3.4 | 2 |
| 1.0 | 3.5 | 1.9 |
| 1.5 | 3.5 | 1.8 |

Thus, the transmembrane pressure has little influence of the Cs/Na selectivity. In addition, the selectivity drops when the ionic strength increases.

EXAMPLE 20

In this example a description is given of a Na/Cs separation installation using FILMTEC NF70 membranes with the addition of tetramethylcalix[4]resorcinolarene as the complexing agent. This installation, illustrated in FIG. 24, makes it possible to treat an effluent having a Na⁺ concentration of 2000 mg/l and a concentration of 25 mg/l, with the addition of 12.5 complexing agent equivalents with respect to Cs.

With this installation, using 4 nanofiltration modules in series (241, 243a, 243b, 243c), on the permeate circuit and 1 nanofiltration module (245) on the retentate circuit with dilution by water, it is possible to obtain an effluent having a [Na⁺]/[Cs⁺] of 20 300 and to supply for vitrification a solution more concentrated in cesium [Na⁺]/(Cs⁺) ratio 8.

EXAMPLE 21

This example follows the operating procedure of example 1 and a study is made of the influence of the volume concentration factor (VCF) on the complexing by polyacrylic acid (PAA) using a FILMTEC NF70 membrane.

The operating conditions are as follows:
ΔP=0.7 MPa
retentate pH=9
number of PAA monomer equivalents/Cs+Sr+U+Ru=2
initial [Na]=2.5 g/l
initial [Sr]=initial [Cs]=initial [UO₂]=initial [Ru]=5 mg/l
T=25° C.
retentate flow rate=800 l/h.

The molar mass of PAA used is 2000 g/mole and its concentration in solution is 2 monomer eq. based on the sum of the cations Sr, Cs, UO₂ and Ru.

The results obtained are given in FIG. 25, which shows the retention rates RR in % of U, Ru, Sr, Cs and Na as a function of the volume concentration factor (VCF).

Thus, for a VCF of 7, half the sodium is eliminated from the initial solution (in concentration relative to the elements Sr, U and Ru). The Sr, Na and Cs contents of the permeate increase with the VCF, whereas the retention rates of U and Ru still exceed 98%. This leakage of Sr and Cs is caused by the increase of the Na concentration rising with the VCF.

In order to avoid this drop in the retention of Sr with the VCF two solutions are envisaged, namely operation as a diafiltration system for maintaining the sodium content constant or increasing the complexing agent content. The diafiltration system involves the addition of a pure water fraction for stabilizing the sodium concentration at the maximum value (approximately 3500 mg/l) accepted for a virtually complete complexing (RRSr=100%) of Sr with 2 monomer equivalents of PAA based on polyvalent cations.

EXAMPLE 22

This example describes a diafiltration system for the separation of polyvalent cations and sodium. This system, illustrated in FIG. 26, makes it possible to treat an effluent having a sodium concentration of 3500 mg/l and has a continuous recycling loop on the FILMTEC NF70 membrane of part of the retentate.

This installation is made to operate under the following conditions:
nanofiltration-complexing combination: FILMTEC NF70—PAA
ΔP=0.5 MPa
number of PAA monomer equivalents/$M^{n+}$=2
pH>7
[Na⁺]=3.5 g/l
initial [$M^{n+}$]=25 mg/l
$RR_{M}n^+$=100%
$RR_{Na+}$=60%
T=25° C.

Thus, there is a virtually complete retention of polyvalent cations and the permeate, essentially containing sodium, can be discharged directly into the ocean.

EXAMPLE 23

This example studies the influence of the concentration of the complexing agent (PAA) on the retention rate of uranium, strontium, cesium and sodium.

Thus, to avoid a strontium retention drop on increasing the sodium concentration, it is possible to increase the complexing agent content in order to displace the complexing equilibrium towards the formation of the complex Sr(PAA). In this case, working takes place with the FILMTEC NF70 membrane under the following conditions:
ΔP=0.5 MPa
retentate pH=9
[Na⁺]10 g/l
[Sr⁺]=[UO₂²⁺]=[Cs⁺]=25 mg/l
T=25° C.
retentate flow rate=800 l/h.

The results obtained are given in FIG. 27, which illustrates the retention rates RR (in %) as a function of the number of PAA monomer equivalents based n Sr, Cs and U.

FIG. 27 makes it clear that for concentrations above 10 PAA monomer eq. based on the radioactive elements, the retention rate of U exceeds 97.5%.

However, the PAA content responsible for the viscosity of the solution must be below a value which would excessively reduce the filtration flow.

Good results are obtained with complexing agent quantities corresponding to 50 monomer eq., i.e. 2 g/l of PAA in solution, the permeate flow rate still being 2.3 l/h.

EXAMPLE 24

In this example treatment takes place of an effluent with a high sodium concentration (50 g/l) and a study is made of the influence of the pressure on the retention of $M^{n+}$, using the FILMTEC NF70 membrane and 50 or 100 PAA monomer eq. based on the cations present in the effluent.

The operating conditions are as follows:
tank pH=9
[Na⁺]=50 g/l $[Sr^{2+}]=[UO_2^{2+}]=[Cs^+]=25$ mg/l
$T=25°$ C.
retentate flow rate=1000 l/h.

The results obtained are given in FIG. 28, which shows the retention rates of sodium, strontium and $UO_2$ as a function of the pressure P (in MPa).

Thus, there is still a Sr/Na selectivity and a high $UO_2$/Na selectivity, because the uranium retention is still above 96%.

The following table gives the Sr/Na and $UO_2$/Na selectivities.

| Transmembrane pressure (MPa) | PAA monomer equivalent number/Cs + Sr + U | Sr/Na selectivity | U/Na selectivity |
|---|---|---|---|
| 0.5 | 50 | 1.52 | >23.9 |
| 1.0 | 50 | 1.95 | >21.3 |
| 1.5 | 50 | 2.4 | >18.9 |
| 0.5 | 100 | 1.8 | >28.4 |
| 1.0 | 100 | 2.3 | >26.4 |
| 1.5 | 100 | 2.8 | >24.3 |

We claim:

1. Process for separating sodium from at least one radioactive element present in an aqueous effluent resulting from the reprocessing of spent nuclear fuel elements, comprising the steps of adding to the effluent a complexing agent for forming a complex with said at least one radioactive element present in the effluent, the complexing agent being an ethylene diamine tetracetic acid, a polyacrylic acid, a polyvinyl sulphonic acid, a salt of said acids or a polyethylene imine, and passing the effluent through a charged porous membrane or a nanofiltration membrane, whose active layer is constituted by a polyaramide, a sulphonated polysuphone, a polybenzimidazolone, a polyvinylidene fluoride, which may or may not be grafted, a polyamide, a cellulose ester, a cellulose ether or a perfluorinated ionomer, by applying between the two opposite faces of the membrane a pressure difference so as to collect a permeate containing sodium depleted in radioactive elements and a retentate enriched in radioactive elements.

2. Process according to claim 1, wherein the radioactive element is chosen from among strontium, cesium, uranium, ruthenium and manganese.

3. Process according to claim 1, wherein the radioactive element is strontium.

4. Process for separating sodium from radioactive cesium and, optionally, one or more additional radioactive elements present in an aqueous effluent resulting from the reprocessing of spent nuclear fuel elements, comprising the steps of adding tetramethylcalix [4] resorcinolarene to the effluent to form a complex with said radioactive cesium and optional one or more radioactive elements, and passing the effluent through a charged porous membrane or a nanofiltration membrane, whose active layer is constituted by a polyaramide, a sulphonated polysuphone, a polybenzimidazolone, a polyvinylidene fluoride, which may or may not be grafted, a polyamide, a cellulose ester, a cellulose ether or a perfluorinated ionomer, by applying between the two opposite faces of the membrane a pressure difference so as to collect a permeate containing sodium depleted in radioactive elements and a retentate enriched in said radioactive cesium and optional one or more radioactive elements.

5. Process according to claim 1 or 4, wherein the nanofiltration or charged porous membrane has an inorganic, alumina porous support coated with an intermediate $TiO_2$ layer and an active perfluorinated ionomer layer of formula:

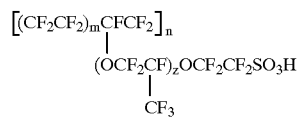

with m, n and x such that
$5 \leq m \leq 13.5$
$n=1000$
$z=1, 2, 3$.

6. Process according to claim 1 or 4, wherein the nanofiltration membrane is a polyaramide membrane complying with the formula:

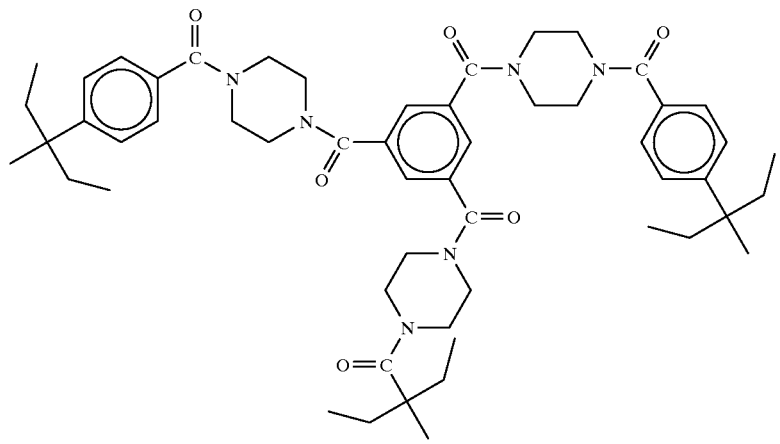

7. Process according to claim 1 or 4, wherein the charged porous membrane comprises a porous alumina support coated with a sulphonated polysulphone layer.

8. Process according to claim 7, characterized in that the radioactive element is cesium.

9. Process according to claim 1 or 4, wherein the aqueous effluent has a pH of 3 to 9.

10. Process according to claim 1 or 4, wherein the pressure difference between the two opposite faces of the membrane is 0.2 to 2.5 MPa.

* * * * *